United States Patent
Muramatsu (10) Patent No.: US 6,222,597 B1
(45) Date of Patent: Apr. 24, 2001

(54) LIQUID CRYSTAL DEVICE AND ELECTRONIC APPARATUS THEREWITH

(75) Inventor: Eiji Muramatsu, Toyoshima-machi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/383,097

(22) Filed: Aug. 25, 1999

(30) Foreign Application Priority Data

Aug. 26, 1998 (JP) .................................. 10-240868
Jun. 8, 1999 (JP) .................................. 11-161300

(51) Int. Cl.$^7$ ....................... G02F 1/1333; G02F 1/1335; H02B 13/02
(52) U.S. Cl. ................... 349/58; 349/62; 349/64; 349/65; 361/615
(58) Field of Search ................... 349/58, 64, 65, 349/62; 361/615, 616, 727, 740, 741, 827

(56) References Cited

U.S. PATENT DOCUMENTS

| | | | |
|---|---|---|---|
| 5,786,877 | * 7/1998 | YAmada | 349/58 |
| 5,804,780 | * 9/1998 | Bartha | 200/5 |
| 5,808,707 | * 9/1998 | Niiboro et al. | 349/60 |
| 5,867,235 | * 2/1999 | Hasegawa | 349/58 |
| 5,905,550 | * 5/1999 | Ohgami et al. | 349/58 |
| 5,966,191 | * 10/1999 | Lee | 349/58 |

FOREIGN PATENT DOCUMENTS

0531122 A2 * 10/1993 (EP) .
2-27390 * 1/1900 (JP) .

* cited by examiner

Primary Examiner—Kenneth Parker
Assistant Examiner—Mike Qi
(74) Attorney, Agent, or Firm—Harness, Dickey & Pierce, P.L.C.

(57) ABSTRACT

A liquid crystal device is provided having a structure which allows an conductive connection to be achieved using only a panel supporting member, without necessitating an additional component such as a cover, thus reducing cost. The liquid crystal device 1 includes a liquid crystal panel 2 including a liquid crystal enclosed between a pair of substrates 7a and 7b, at least one of which includes a panel-side electrode terminal 11, a light guide 17 for supporting the liquid crystal panel 2 on a main substrate 23 including a main substrate-side electrode terminal 28, and an elastic connector 4 for conductively connecting the panel-side electrode terminal 11 and the main substrate-side electrode terminal 28 to each other. The light guide 17 includes an engagement pawl 24 for engagement with the main substrate 23 and a uniformly pressing member 31 for uniformly applying pressure to the elastic connector 4. A pawl member is employed as the uniformly pressing member 31 which engages an engagement hole 32 thereby achieving a connection with the main substrate 23 so as to allowing the pressure applied to the elastic connector 4 to become uniform.

10 Claims, 8 Drawing Sheets

LIQUID CRYSTAL DEVICE AND ELECTRONIC APPARATUS THEREWITH

BACKGROUND OF THE INVENTION

1. Field of the Invention

The present invention relates to a liquid crystal device including a liquid crystal sealed between a pair of substrates and also to an electronic apparatus constructed using such a liquid crystal device.

2. Description of the Related Art

In recent years, liquid crystal devices are used as image display units in a wide variety of devices such as portable telephones, portable electronic terminals, electronic personal organizers, and other electronic devices. Liquid crystal devices are produced by bonding a pair of substrates to each other and enclosing a liquid crystal within a space called a cell gap formed between the substrates.

The substrates are each formed of, for example, a transparent substrate, and transparent electrodes are formed on both substrates such that the transparent electrodes face each other. Polarizers are disposed, as necessary, on the outer surfaces of the pair of substrates. Furthermore, if required, a color filter is disposed on the inner surface of one substrate.

In these liquid crystal devices, the alignment of the liquid crystal is controlled by varying the voltage applied between the electrodes opposing each other via the liquid crystal so as to modulate light supplied to the liquid crystal, thereby displaying an image such as a character, numeral, or pattern. In common liquid crystal devices, the control of the voltage applied between the opposing electrodes is accomplished by a liquid crystal driving integrated circuit (IC) electrically connected to the electrodes.

Figure 8:
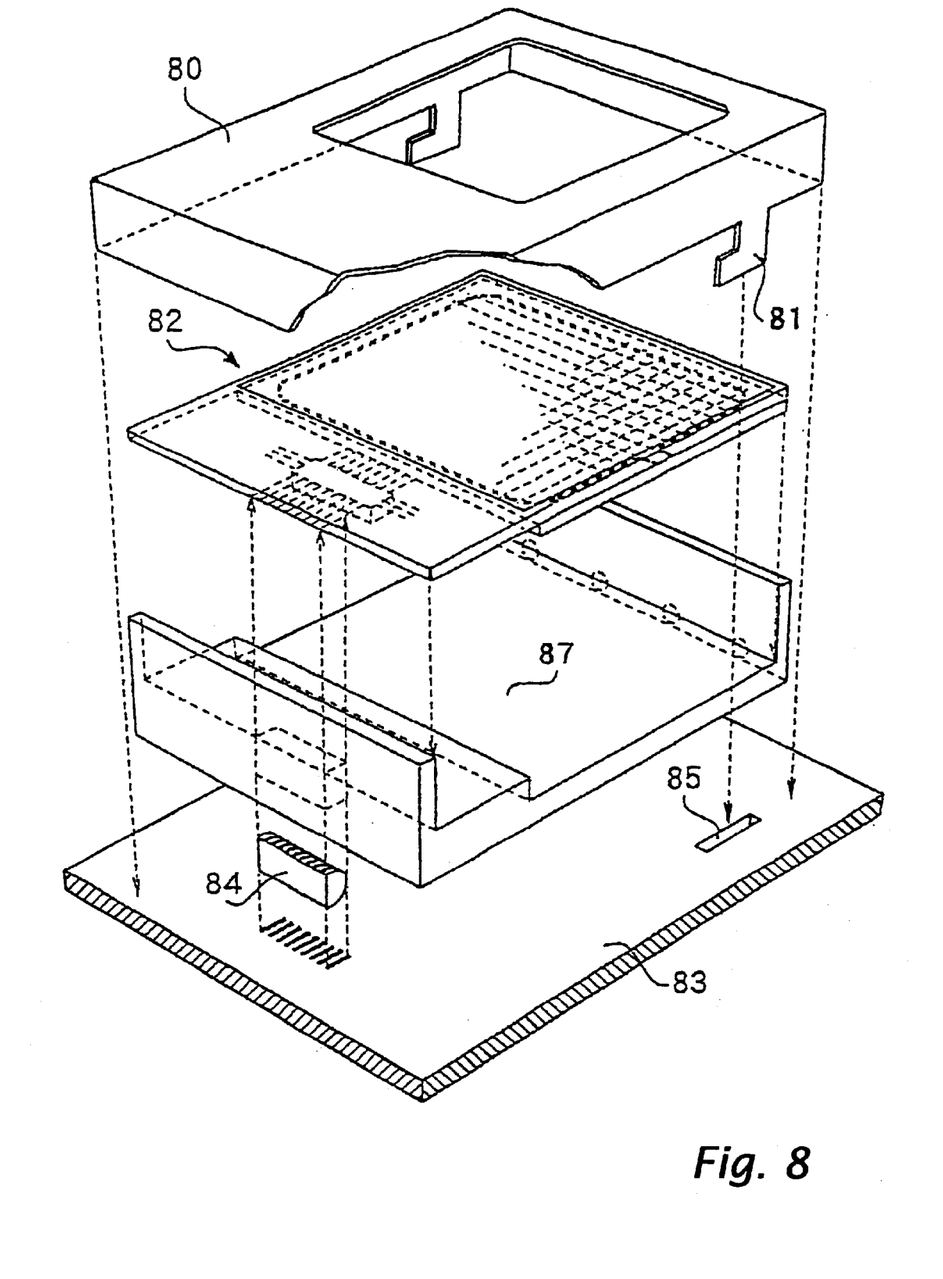
FIG. 8 is an exploded perspective view illustrating an example of a conventional liquid crystal device.
Figure 9:
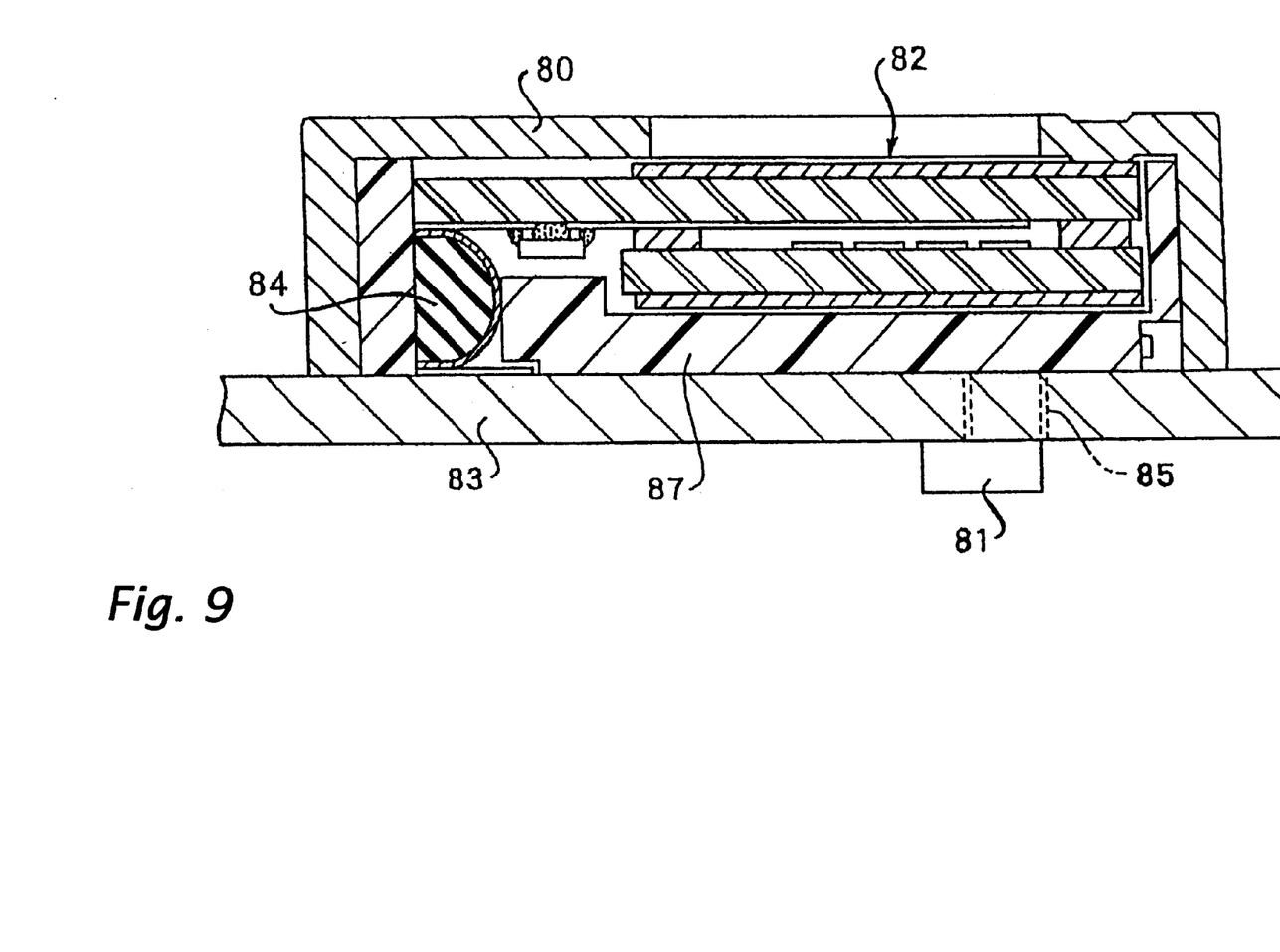
FIG. 9 is a side view illustrating the structure in cross section of the liquid crystal device of FIG. 8.

In a conventional liquid crystal device, as shown in FIGS. 8 and 9, a light guide 87 serving as a panel supporting member is disposed on a main substrate 83 which is one component of an electronic apparatus such as a portable telephone, and a liquid crystal panel 82 is placed on the light guide 87. Furthermore, a cover 80 is placed thereon from above. The cover 80 is connected to the main substrate 83 by engaging an engagement lug 81 formed at the bottom of the cover 80 into an engagement hole 85 thereby fixing the liquid crystal panel 82 at a predetermined location on the main substrate 83. The cover 80 is usually formed of a metal such as stainless steel.

In the conventional liquid crystal device, the cover 80 is provided primarily to fix the liquid crystal panel 82 to the light guide 87 in such a manner that the liquid crystal panel 82 and the light guide 87 are combined together in an integral fashion. The cover also applies a uniform pressure to an elastic connector 84 disposed between the liquid crystal panel 82 and the main substrate 83, thereby electrically conductively connecting a panel-side electrode terminal formed on the liquid crystal panel 82 to a main substrate-side electrode terminal formed on the main substrate 83. However, the cover employed in the conventional liquid crystal device results in an increase in cost and also an increase in the number of assembly steps.

In view of the above, it is an object of the present invention to provide a liquid crystal device having a structure which allows a liquid crystal panel to be fixed using only a light guide (panel supporting member) without necessitating an additional member such as a cover, thereby achieving a reduction in cost.

SUMMARY OF THE INVENTION (1) According to an aspect of the present invention, to achieve the above object, there is provided a liquid crystal device comprising a liquid crystal panel including a liquid crystal enclosed between a pair of substrates, at least one of which includes a panel-side electrode terminal, and a light guide which supports the liquid crystal panel and which transmits light from a light source. The liquid crystal device is characterized in that the light guide includes panel fixing means for fixing the liquid crystal panel.

In this liquid crystal device, the liquid crystal panel is fixed on the light guide by the fixing means provided on the light guide, and the light guide is engaged with a main substrate via the engagement means provided on the light guide, thereby mounting the liquid crystal panel at a predetermined location on the main substrate. This ensures that a highly-reliable conductive connection is achieved between the panel-side electrode terminal and the main substrate-side electrode terminal. When an elastic connector is employed to make the electric connection between the panel-side electrode terminal and the main substrate-side electrode terminal, the above-described construction of the liquid crystal device according to the present aspect allows pressure to be applied uniformly to a conductive part of the elastic connector, thereby ensuring that highly-reliable conductive connection is achieved between the panel-side electrode terminal and the main substrate-side electrode terminal. Because such a highly-reliable conductive connection can be obtained using only the light guide without necessitating an additional component such as a cover, reductions in both component cost and assembly cost are achieved.

(2) According to another aspect of the invention, there is provided a liquid crystal device comprising a liquid crystal panel including a liquid crystal enclosed between a pair of substrates, at least one of which including a panel-side electrode terminal, a panel supporting member for supporting the liquid crystal panel above a main substrate including a main substrate-side electrode terminal, and an elastic connector for conductively connecting the panel-side electrode terminal and the main substrate-side electrode terminal to each other. The liquid crystal device is characterized in that the panel supporting member includes engagement means which includes an engagement member for engagement with the main substrate and a pressing member for pressing the elastic connector so as to apply pressure thereto.

In this liquid crystal display device, the panel supporting member is fixed on the main substrate via the engagement member and the liquid crystal panel is supported by the panel supporting member such that the liquid crystal panel is fixedly placed at a predetermined location above the main substrate. Furthermore, the pressing member formed on the panel supporting member allows pressure to be applied uniformly to a conductive part of the elastic connector, thereby ensuring that a highly-reliable conductive connection is achieved between the panel-side electrode terminal and the main substrate-side electrode terminal. Because such a highly-reliable conductive connection can be obtained using only the panel supporting member without necessitating an additional member such as a cover, reductions in both component cost and assembly cost are achieved.

In the liquid crystal device constructed in the above-described manner, the "elastic connector" is a connector which is elastically deformed when pressure is applied thereto, wherein the elastic deformation produces an elastic restoring force which allows the pair of terminals opposing each other to be conductively connected. More specifically, a rubber connector shown in FIG. 3, a rubber connector shown in FIG. 4, or a spring connector shown in FIG. 5 may be employed.

(3) In the liquid crystal device described above, the pressing member of the engagement means may be formed in an arbitrary structure that allows pressure to be uniformly applied to the elastic connector. More specifically, the uniformly pressing member may be formed as follows: (i) an engagement member for engagement with the main substrate is formed, at a location near the elastic connector, on the panel supporting member such that the engagement member also serves as the pressing member; (ii) the pressing member is realized by a screw or another fastening member which is located near the elastic connector and which serves to fasten the panel supporting member to the main substrate; or (iii) a part of the panel supporting member in accordance with the elastic connector is enhanced in rigidity, thereby allowing the part to serve as the pressing member. In the structure described in (iii), the enhancement of the rigidity may be achieved by increasing the thickness of that part of the panel supporting member or by forming a reinforcing element such as a rib on that part.

(4) When the liquid crystal device includes a light source and a light guide for transmitting light from the light source to the liquid crystal panel, that is, when the liquid crystal device includes an illumination device called a backlight device, the panel supporting member described above may be realized by using the light guide. In this case, it becomes unnecessary to separately provide a member dedicated to serving as the panel supporting member. This avoids an increase in cost.

(5) In the liquid crystal device described above, the "supporting" of the liquid crystal panel by the panel supporting member refers to simply placing of the liquid crystal panel on the panel supporting member. To fix the liquid crystal panel on the panel supporting member, panel fixing means is formed on the panel supporting member. The liquid crystal panel is fixed on the panel supporting member by this panel fixing means and is maintained in a correct position. Furthermore, when the panel-side electrode terminal and the main substrate-side electrode terminal are electrically connected via the elastic connector by means of the elastic force, fixing the liquid crystal panel in such a manner makes it possible to maintain a good conductive connection.

(6) In the case where the liquid crystal panel is fixed on the panel supporting member by the panel fixing means formed on the panel supporting member in the manner described in (5), the panel fixing means may be an engagement member formed integrally with the panel supporting member. More specifically, as for the engagement member, a fixing pawl may be preferably employed which has a latching part formed at the end of thereof and which fixes the liquid crystal panel by means of an elastic restoring force such that the liquid crystal panel is pressed against the surface of the panel supporting member. A combination of such a fixing pawl and a protrusion formed integrally with said panel supporting means at the end of thereof in such a manner as to protrude toward the display area of the panel may also be employed as the fixing means. Alternatively, an adhesive or an adhesive tape may also be employed. If the fixing member is realized by a fixing member formed integrally with the panel supporting member, productivity is improved compared with the case where an adhesive tape or the like is employed.

(7) According to another aspect of the invention, there is provided an electronic apparatus comprising a liquid crystal device and a controller for controlling an image displayed on said liquid crystal device, wherein the liquid crystal device is formed of a liquid crystal device according to any of techniques described above in (1) to (6). The electronic apparatuses according to the invention include a portable telephone, an electronic personal organizer, a portable communication/information terminal, and the like. In these electronic apparatuses, the liquid crystal device according to the invention may be employed to display an image such as a character, a numeral, or a pattern.

In the electronic apparatus according to the invention, a uniformly pressing member is formed on the panel supporting member of the liquid crystal device so that pressure is applied uniformly to the elastic connector, thereby ensuring that a highly-reliable conductive connection is achieved between the panel-side electrode terminal and the main substrate-side electrode terminal. Such a highly-reliable conductive connection is achieved using only the panel supporting member without having to use a cover, and thus reductions in both component cost and assembly cost can be achieved.

DETAILED DESCRIPTION OF THE PREFERRED EMBODIMENTS

Figure 1:
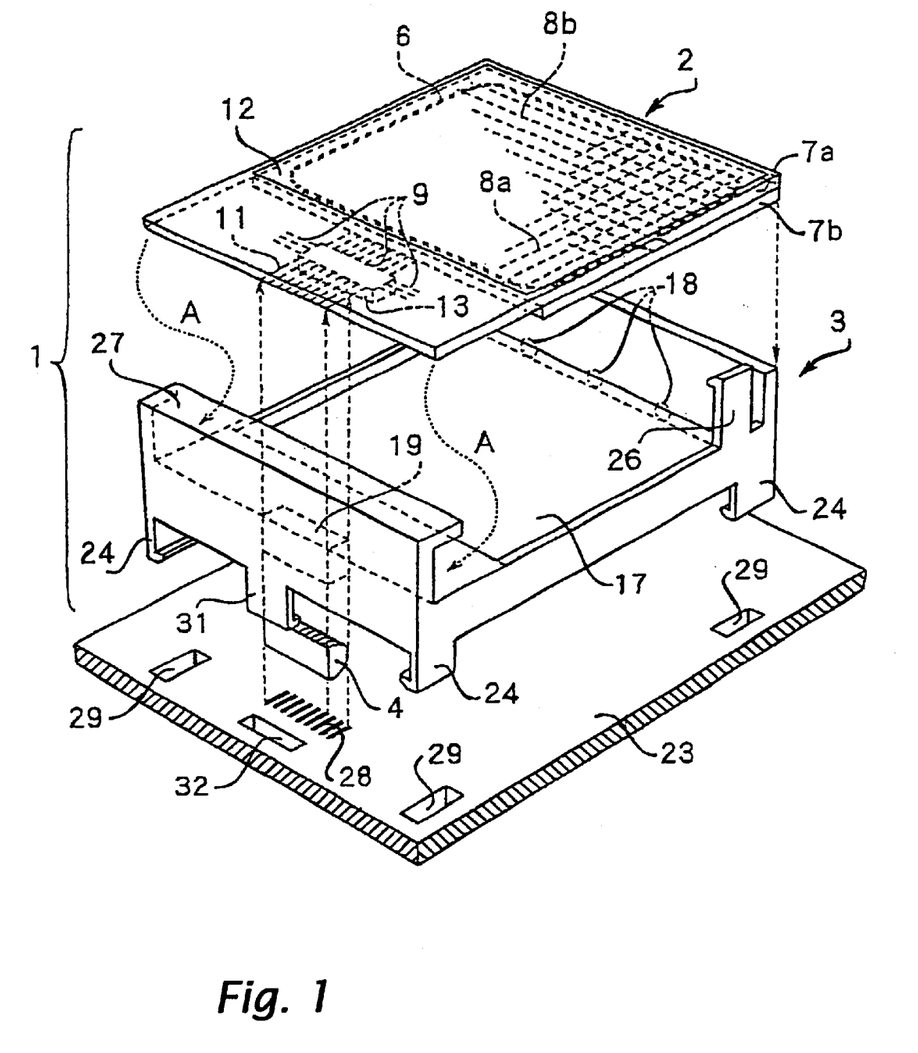
FIG. 1 is a perspective view illustrating an embodiment of a liquid crystal device according to the present invention.
Figure 2:
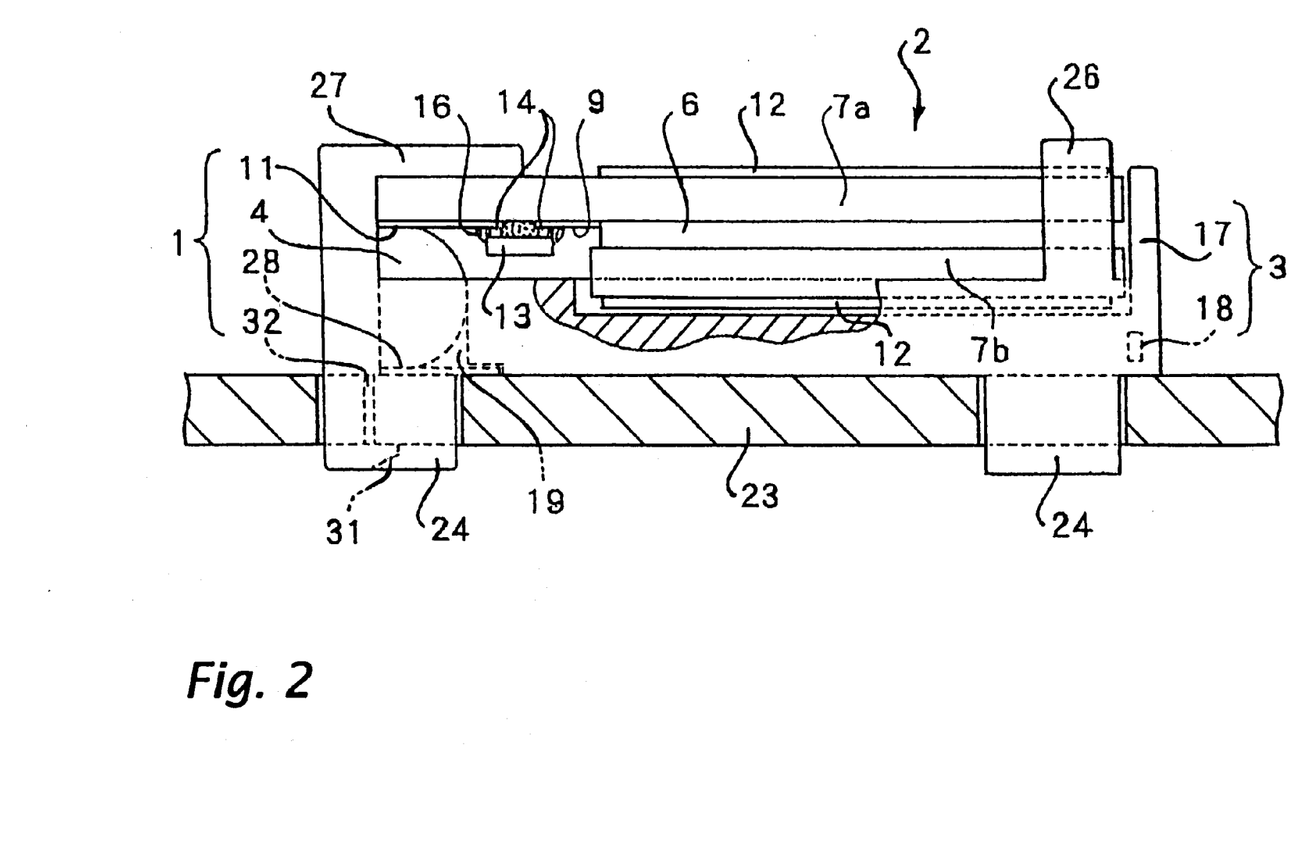
FIG. 2 is a side view illustrating the liquid crystal device of FIG. 1 in a partially cut-away fashion.

FIG. 1 illustrates, in an exploded fashion, an embodiment of a liquid crystal device according to the present invention, and FIG. 2 is a side view illustrating, in a partially cutaway fashion, the liquid crystal device in an assembled state. The liquid crystal device 1 according to the present embodiment includes a liquid crystal panel 2, a backlight unit 3, and an elastic connector 4. The liquid crystal panel 2 includes a pair of substrates 7a and 7b connected to each other via a sealing material 6. These substrate 7a and 7b are formed of a transparent material such as glass, plastic. Polarizers 12 are bonded to the respective outer surfaces of these substrates.

A narrow gap, a so-called cell gap, is formed between the substrates 7a and 7b, and a liquid crystal is disposed in a sealed fashion within the cell gap. Linear transparent electrodes 8a are formed on the inner surface of one substrate 7a and linear electrodes 8b extending in a direction perpendicular to the electrodes 8a are formed on the inner surface of the other substrate 7b. These electrodes 8a and 8b are formed, for example, of ITO (indium tin oxide). One pixel for displaying an image is formed at each intersection between the electrodes 8a and 8b. The shape of the electrodes 8a and 8b is not limited to being linear, and they may be constructed in another proper form such as a mark or a pattern.

One substrate 7a has a protruding part extending outward beyond an edge of the opposite substrate 7b. A plurality of IC output terminals 9 and a plurality of panel-side electrode terminals 11 are formed using, for example, ITO on the surface of the protruding part. The plurality of IC output terminals 9 include those continuously extending from electrodes 8a and those connected to electrodes 8b via conductive elements.

In practical applications, the electrodes 8a, 8b, the IC output terminals 9, and the panel-side terminals 11 are formed in such a manner that a great number of these terminals are arranged at very small intervals on each substrate. However, in FIG. 1, these terminals are schematically represented in expanded intervals for a better understanding of their structure. Furthermore, connections between the IC output terminals 9 and the electrodes 8a and 8b are not shown in FIG. 1.

A liquid crystal driving IC 13 is disposed on the protruding part of the substrate 7a. More specifically, as shown in FIG. 2, bumps 14 on the liquid crystal driving IC 13 are conductively connected to the IC output terminals 9 and the panel-side electrode terminals 11 via an ACF (anisotropic conductive film) 16.

The Anisotropic Conductive Film 16 is a conductive high-polymer film used to make conductive connections between pairs of terminals in a batch fashion, as is known. The ACF 16 may be formed, for example, by dispersing conductive particles within a thermoplastic resin film or a thermosetting resin film. Conductive connections in a particular single direction can be realized by connecting the ACF 16 by means of thermo-compression bonding.

The backlight unit 3 includes a light guide 17 and a plurality of LEDs (light emitting diodes) 18 disposed on one end of the light guide 17. At the other end of the light guide 17, a guide hole 19 for guiding the elastic connector 4 is formed. This guide hole 19 is formed to have a size that can snugly receive the elastic connector 4.

Engagement pawls 24 serving as engagement members are formed in respective four corners on the bottom of the light guide 17. In FIG. 1, only three visible engagement pawls 24 are illustrated, and one engagement pawl hidden behind the light guide 17 is not shown. A fixing pawl 26 serving as a fixing member is formed on each of two opposite sides of the light guide 17, at locations near the end on which LEDs 18 are disposed. In FIG. 1, only one fixing pawl 26 is illustrated and the remaining one hidden behind the liquid crystal panel 2 is not shown.

A pressure pawl 31 serving as a uniformly pressing member is formed on the lower surface of the light guide 17, at the end where the guide hole 19 is formed and at a location close to the guide hole 19. On the upper surface of the light guide 17, at the end where the guide hole 19 is formed, a protruding part 27 protruding toward the inside of light guide 17 is formed. A space is formed between the protruding part 27 and the upper surface of the light guide 17 such that an end portion of the liquid crystal panel 2 can be inserted into that space.

The engagement pawls 24, the fixing pawls 26, and the pressure pawl 31 each have, at their top, a projection or a latching part in the form of a pawl projecting inwardly to latch a target object. With these latch parts, the light guide 17 and the target object are engaged and connected with each other.

The light guide 17 may be formed of either (1) a transparent resin such as an acrylic resin, a polycarbonate resin, or amorphous polyolefin resins; (2) a transparent inorganic material such as glass; or (3) a mixture of any of the above-described materials. The light guide 17 may be formed by any of methods: (1) injection molding; (2) a technique using photo-curing of a resin; (3) etching; or (4) adhesively bonding a film to a surface of a plate made of a transparent resin or glass.

When the light guide 17 is produced, the engagement pawls 24, the fixing pawls 26, and the protruding part 27 are formed integrally with the light guide 17. Alternatively, after producing the engagement pawls 24, the fixing pawls 26, and the protruding part 27 separately from the light guide 17, they may be connected into a single piece using an adhesive or other connecting means.

Figure 3:
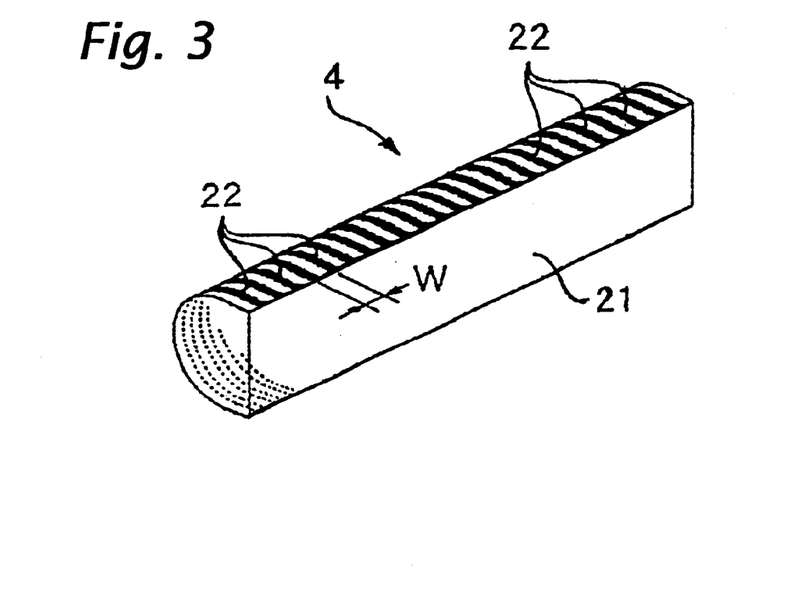
FIG. 3 is a perspective view illustrating an example of an elastic connector.
Figure 4:
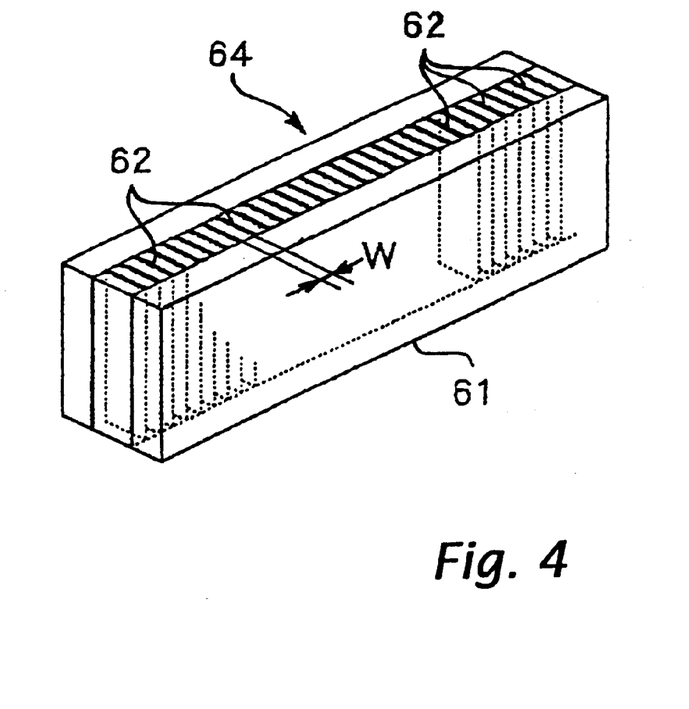
FIG. 4 is a perspective view illustrating another example of an elastic connector.

The elastic connector 4 comprises, as shown in FIG. 3, an elastic base 21 formed in the shape of a semicircle or the letter "U" rotated on its side in cross section using a material which is elastic and electrically insulating such as silicone rubber, and a large number of conductive parts 22 are formed so as to be parallel to each other on the circumferential surface of the elastic base 21. All adjacent conductive parts 22 are spaced from each other by, for example, 15 $\mu$m to 25 $\mu$m and are electrically isolated from each other by the elastic material. In FIGS. 3 and 4, symbol "W" denotes the distance or pitch between adjacent conductive parts 22. The pitch is generally set to a value in a range of from 30 $\mu$m to 50 $\mu$m.

Referring again to FIG. 1, reference numeral 23 denotes a main substrate on which the liquid crystal device 1 is mounted. The main substrate 23 is one of the parts constituting an electronic apparatus such as a portable telephone. On this main substrate 23, there is provided a plurality of main substrate-side electrode terminals 28 through which electric power and signals for driving the liquid crystal device 1 are supplied. The main substrate 23 has engagement holes 29 for receiving the corresponding engagement pawls 24 formed in the respective four corners on the lower surface of the light guide 17, and also has a pressure pawl engagement hole 32 for receiving the pressure pawl 31 formed on the light guide 17.

In the liquid crystal device 1 and the main substrate 23 constructed in the above-described manner according to the present embodiment, when the liquid crystal device 1 is mounted on the main substrate 23, the elastic connector 4 is first inserted into the guide hole 19 of the light guide 17. Then each engagement pawl 24 of the light guide 17 is inserted into the corresponding engagement hole 29 of the main substrate 23. Finally, the pressure pawl 31 is inserted into the pressure pawl engagement hole 32, and thus the mounting of the light guide 17 on the main substrate 23 is completed. In this way, the engagement pawls 24 and the pressure pawl 31 are fitted in the engagement holes 29 and the pressure pawl engagement pawl 32, respectively, such that the light guide 17, and thus the backlight unit 3, are firmly fixed at predetermined positions above the main substrate 23.

One end, on which the liquid crystal driving IC 13 is located, of the liquid crystal panel 2 is then inserted into the space below the protruding part 27 as indicated by the arrow A and the opposite end of the liquid crystal panel 2 is pressed against the upper surface of the light guide 17 so that the liquid crystal panel 2 moves toward the light guide 17 while outwardly expanding the latching parts at the end of the fixing pawls 26. When the liquid crystal panel 2 reaches the upper surface of the light guide 17, the latching parts at the end of the fixing pawls 26 are released from engagement with the liquid crystal panel 2. As a result, the latching parts at the end of the fixing pawls 26 are moved by means of elastic restoring force to upper positions of the liquid crystal panel 2. Thus, the liquid crystal panel 2 is pressed against the surface of the light guide 17 and is firmly fixed, as shown in FIG. 2, by the protruding part 27 and the fixing pawls 26 of the light guide 17.

The elastic connector 4 is pressed with a predetermined uniform pressure over the length thereof by the end part, on the side where the panel-side electrode terminals 11 are formed, of the liquid crystal panel 2 against the surface of the main substrate 23 by means of engagement between the pressure pawl 31 and the pressure pawl engagement hole 32. This ensures that the panel-side electrode terminals 11 are conductively connected in a highly reliable fashion to the main substrate-side electrode terminals 28 through the conductive parts 22 of the elastic connector 4. By disposing the pressure pawl 31 in close proximity to the elastic connector 4, it becomes possible to uniformly apply pressure to the elastic connector 4, and thus the elastic connector 4 can provide connections with a high connection reliability.

If the assembly of the liquid crystal device 1 on the main substrate 23 is completed, it becomes possible to supply an electric signal and liquid crystal driving power to the liquid crystal driving IC 13 through the main substrate-side electrode terminals 28, the elastic connector 4, and the panel-side electrode terminals 11. According to the received electric signal, the liquid crystal driving IC 13 controls the voltages applied to the electrodes 8a and 8b of the liquid crystal panel 2. As a result of the voltage control described above, light transmitted from the LED 18 to the liquid crystal panel 2 through the light guide 17 is modulated on a pixel-by-pixel basis by the above described voltage control so as to display an image such as a character and a number in the display area of the liquid crystal panel 2.

In the liquid crystal device according to the present embodiment, as described above, the light guide 17 serving as the panel supporting member is fixed to the main substrate 23 by the engagement pawls 24 serving as the engagement members and the liquid crystal panel 2 is supported by the light guide 17 so as to mount the liquid crystal panel 2 at the predetermined position above the main substrate 23. Furthermore, the pressure pawl 31 serving as the uniformly pressing member is formed in the light guide 17 so that pressure is uniformly applied to the elastic connector 4 thereby ensuring that highly-reliable conductive connections are achieved between the panel-side electrode terminals 11 and the main substrate-side electrode terminals 28. Such highly-reliable conductive connections are achieved using only the light guide 17 without necessitating a cover (such as a cover 80 shown in FIG. 8) which is used conventionally. This allows reductions in both component cost and assembly cost.

FIG. 4 shows a rubber connector 64 which is a modification of the elastic connector for use in the present invention. This rubber connector 64 comprises an elastic base 61 formed in a generally rectangular shape using a material which is elastic and electrically insulating, such as silicone rubber, and a large number of conductive parts 62 disposed parallel to each other inside the elastic base 61. The upper and lower ends of the respective conductive parts 62 are exposed to the outside of the elastic base 61. Adjacent conductive parts 62 are all spaced from each other by the pitch W, for example, ranging from 30 µm to 50 µm and are electrically isolated from each other by the elastic material. In FIG. 1, each of the panel-side electrode terminals 11 on the side of the liquid crystal panel 2 and each of the main substrate-side electrode terminals 28 on the side of the main substrate 23 are respectively conductively connected to each other through the respective conductive parts 62 of the rubber connector 64.

Figure 5:
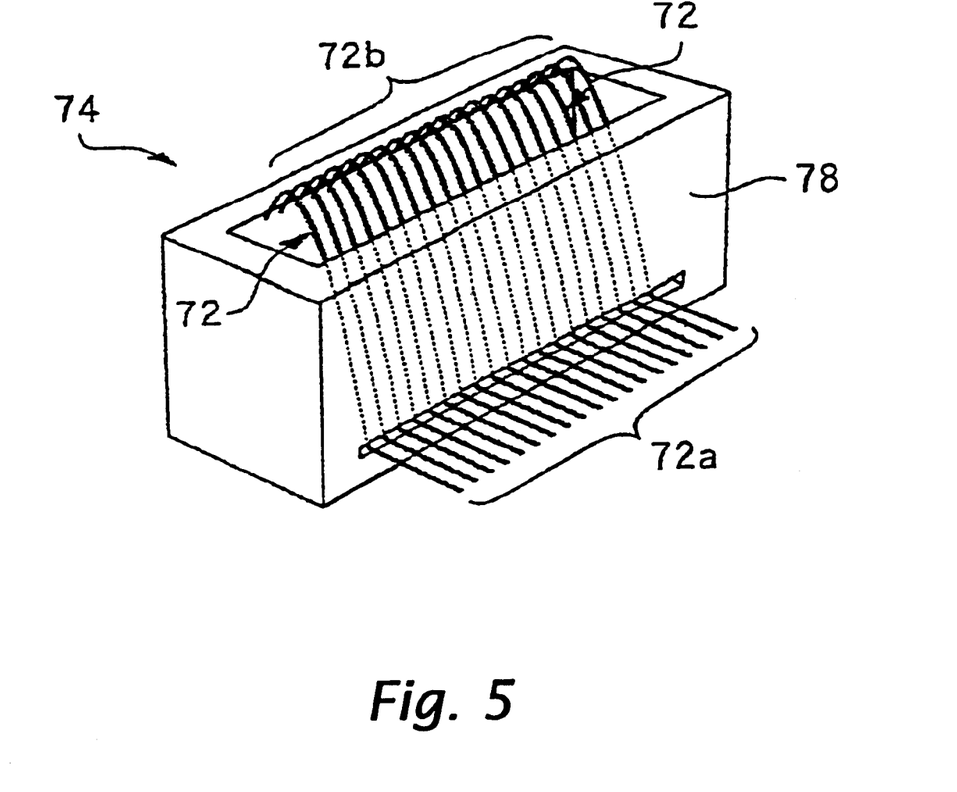
FIG. 5 is a perspective view illustrating another example of an elastic connector.

FIG. 5 illustrates a spring connector 74 which is another modification of the elastic connector for use in the present invention. This spring connector 74 can be used instead of the rubber connector 4 shown in FIG. 3 or the rubber connector 64 shown in FIG. 4. The spring connector 74 shown in FIG. 5 is formed of a plurality of spring terminals 72 arranged parallel to each other and a case 78 in which the spring terminals 72 are disposed. Each spring terminal 72 includes a fixed terminal 72a extending to the outside of the case 78 from its one side and a movable terminal 72b extending to the outside of the case 78 from its upper surface. The movable terminals 72b have elasticity which allow them to move up and down in FIG. 5.

The spring connector 74 is fixed on the main substrate 23 such that the fixed terminals 72a are conductively connected via solder or the like to the main substrate-side electrode terminals 28 on the main substrate 23 (refer to FIG. 1). If the backlight unit 3 and the liquid crystal panel 2 are mounted on the main substrate 23 on which the spring connector 74 is disposed, then the panel-side electrode terminals 11 of the liquid crystal panel 2 come into contact with the movable terminals 72b of the spring connector 74, and the panel-side electrode terminals 11 press the movable terminals 72b downward. Because the spring terminal 72 itself has elastic properties, the movable terminals 72b press the panel-side electrode terminals 11 by means of their elastic force. This ensures that highly-reliable conductive connections are provided between the movable terminals 72b and the panel-side electrode terminals 11.

Figure 6:
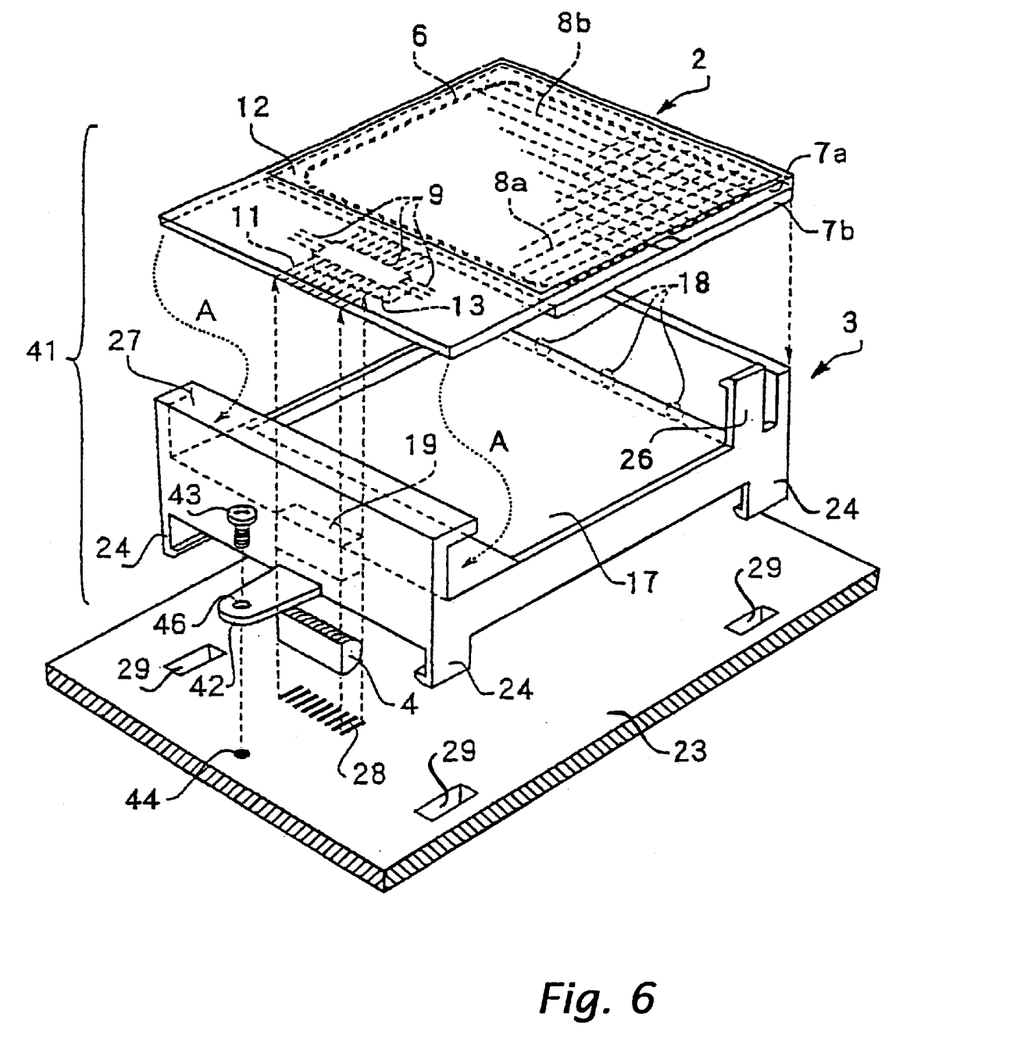
FIG. 6 is a perspective view illustrating another embodiment of a liquid crystal device according to the present invention.

FIG. 6 illustrates another embodiment of a liquid crystal device according to the present invention. The liquid crystal device 41 shown in FIG. 6 is different from the liquid crystal device 1 shown in FIG. 1 in that a modification is made to the uniformly pressing member for making the pressure which is applied to the elastic connector uniform when the liquid crystal device is assembled on the main substrate. In FIG. 6, elements similar to those in FIG. 1 are denoted by similar reference numerals and they are not described in further detail here.

In the liquid crystal device 1 shown in FIG. 1, the uniformly pressing member is realized using the pressure pawl 31 having the latching part formed at the end thereof and the pressure pawl engagement hole 32 for engagement with the latching part. In contrast, in the present embodiment shown in FIG. 6, the uniformly pressing member is realized by a protruding part 42 formed on the light guide 17 in close proximity to the guide hole 19, a screw 43, and a threaded hole 44 formed in the main substrate 23.

A through-hole 46 having a size capable of receiving the screw 43 is formed in the protruding part 42 so that after passing the screw 43 through the through-hole 46, the screw 43 can be screwed into the threaded hole 44. The protruding part 42 is formed in close proximity to the guide hole 19 so that after inserting the elastic connector 4 in the guide hole 19 and then attaching the liquid crystal panel 2 to the upper surface of the light guide 17 and finally mounting the light guide 17 on the main substrate 23, if the screw 43 is screwed into the threaded hole 44 via the through-hole 46, then pressure is applied uniformly to the elastic connector 4. Thus, also in this embodiment, uniform application of pressure can be achieved using only the light guide 17 without necessitating a cover (such as a cover 80 shown in FIG. 8) which is used conventionally. This allows reductions in both component cost and assembly cost.

Figure 7:
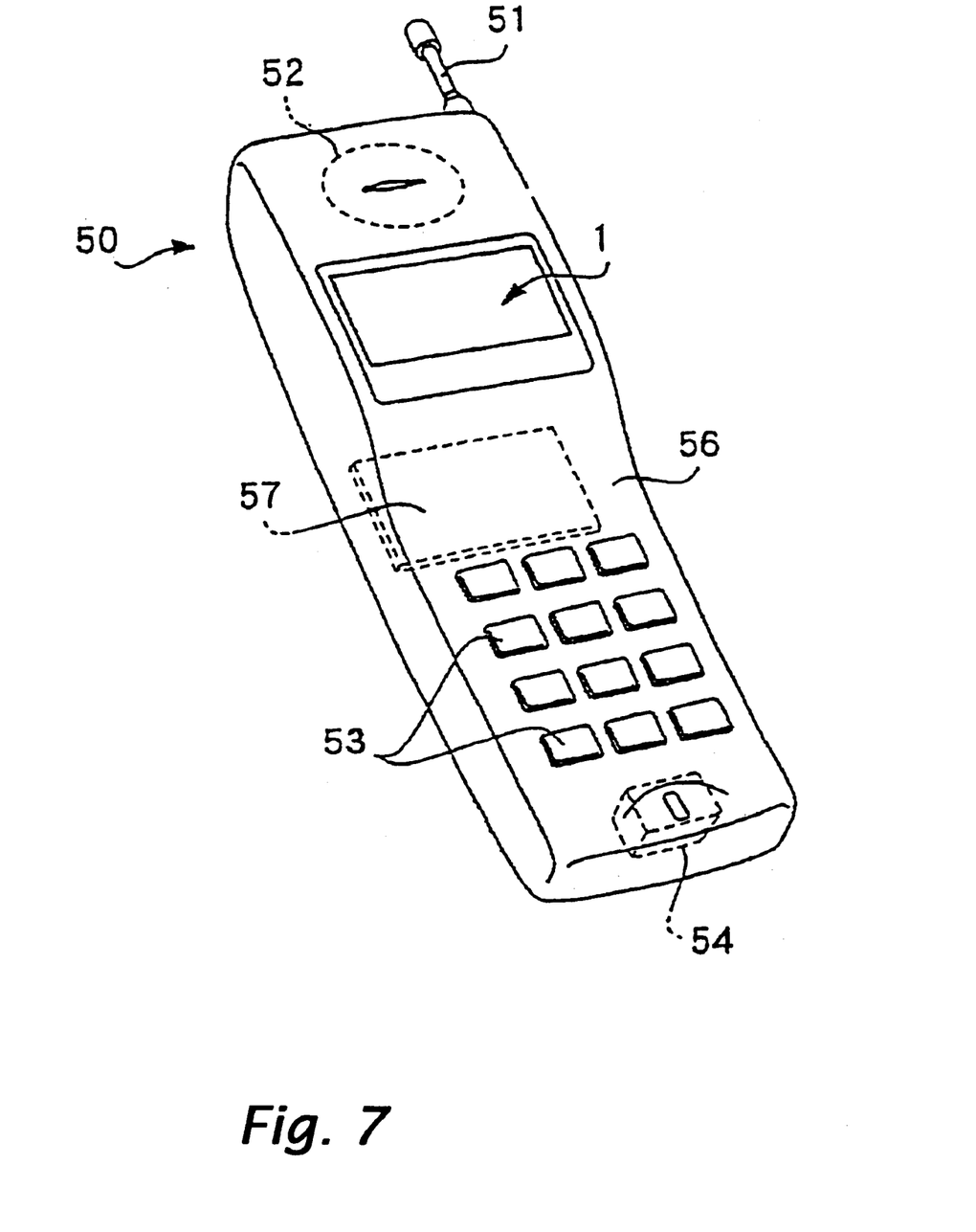
FIG. 7 is a perspective view illustrating an embodiment of an electronic apparatus according to the present invention.

FIG. 7 illustrates a portable telephone which is an embodiment of an electronic apparatus according to the present invention. The portable telephone 50 comprises an antenna 51, a loudspeaker 52, a liquid crystal device 1, key switches 53, a microphone 54, and the like, wherein these components are disposed in a case 56. In the case 56, there is also provided a control circuit board 57 on which a control circuit for controlling the above-described components is mounted. The liquid crystal device 1 described above with reference to FIG. 1 may be employed herein as the liquid crystal device 1.

In this portable telephone 50, signals input via the microphone 54 or key switches 53, and signals received via the antenna 51, are applied to the control circuit on the control circuit board 57. According to the input data, the control circuit displays an image such as a numeral, character, or pattern in the display area of the liquid crystal device 1. The control circuit also transmits data via the antenna 51.

Also in the liquid crystal device 1 used in this portable telephone 50, as shown in FIG. 1, the light guide 17 serving as the panel supporting member is fixed to the main substrate 23 by the engagement pawls 24 serving as the engagement members and the liquid crystal panel 2 is supported by the light guide 17 so as to mount the liquid crystal panel 2 at the predetermined position above the main substrate 23. Furthermore, because the pressure pawl 31 serving as the uniformly pressing member is formed on the light guide 17, pressure is uniformly applied to the elastic connector 4, thereby ensuring that highly-reliable conductive connections are achieved between the panel-side electrode terminals 11 and the main substrate-side electrode terminals 28. Such highly-reliable conductive connections are achieved using only the light guide 17 without necessitating a cover (such as a cover 80 shown in FIG. 8) which is used conventionally. This allows reductions in both component cost and assembly cost.

The present invention has been described above with reference to preferred embodiments. However, the present invention is not limited to those embodiments and various modifications are possible without departing from the scope of the invention as defined by the appended claims.

For example, although in the embodiment shown in FIG. 1, a liquid crystal device of the COG (chip-on-glass) type is disclosed in which a liquid crystal driving integrated circuit is directly mounted on the substrate 7a of the liquid crystal panel 2, the invention may also be applied to a liquid crystal device having another structure.

Furthermore, although in the embodiment shown in FIG. 7, the liquid crystal device according to the present invention is applied to a portable telephone taken as an example of an electronic apparatus, the liquid crystal device according to the present invention may also be applied to other types of electronic apparatus such as a portable information terminal, an electronic personal organizer, a viewfinder of a video camera, and the like.

In the embodiment shown in FIG. 1, the liquid crystal device 1 is disclosed which is of the transmissive type using the backlight device 3 serving as the illumination device. A reflective liquid crystal device is also known which displays an image by means of reflection of external light such as solar light without using an illumination device. In such a reflective liquid crystal device, no light guide is used and thus the panel supporting member is formed of a component other than the light guide, although it is possible to provide a member dedicated to supporting the liquid crystal panel.

As can be appreciated from the above description, the present invention has various advantages. That is, in the liquid crystal device and electronic apparatus according to the present invention, the uniformly pressing member formed on the panel supporting member allows pressure to be applied uniformly to the elastic connector, thereby ensuring that highly-reliable conductive connections are achieved between the panel-side electrode terminals and the main substrate-side electrode terminals. Such highly-reliable conductive connections can be obtained without using an additional component such as a cover, and thus reductions in both component cost and assembly cost are achieved.

What is claimed is:

1. A liquid crystal device comprising:
   a liquid crystal panel including a liquid crystal between a pair of substrates, at least one substrate including a panel-side electrode terminal;
   a light guide interposed between said liquid crystal panel and a main substrate, said light guide supporting said liquid crystal panel on an upper surface of said light guide and above said main substrate said main, substrate, including a main substrate-side electrode terminal; and
   an elastic connector disposed between said liquid crystal panel and said main substrate for conductively connecting said panel-side electrode terminal to said main substrate-side electrode terminal;
   wherein said light guide includes a plurality of engagement pawls for engagement with said main substrate and a pressing member connected to said main substrate in close proximity to said elastic connector, said pressing member pressing said elastic connector between said liquid crystal panel and said main substrate so as to apply a predetermined uniform pressure thereto.

2. A liquid crystal panel according to claim 1, further comprising a light source, said light guide transmitting light from said light source to said liquid crystal panel.

3. A liquid crystal panel according to claim 1, wherein said light guide includes latching members for fixing said liquid crystal panel to said upper surface of said light guide.

4. A liquid crystal panel according to claim 3, wherein said latching members further comprise a fixing pawl including a latching part formed at an end thereof, for fixing the liquid crystal panel by means of elastic restoring force.

5. An electronic apparatus comprising a liquid crystal device and a controller for controlling an image displayed on said liquid crystal device, wherein said liquid crystal device is formed of a liquid crystal device according to claim 2.

6. A liquid crystal device comprising:
   a substrate including a first electrode terminal;
   an elastic connector disposed on said substrate and conductively connected to said first electrode terminal;
   a liquid crystal panel disposed opposite said substrate, said liquid crystal panel including a second electrode terminal conductively connected to said elastic connector; and
   a light guide disposed between said substrate and said liquid crystal panel, said light guide supporting said liquid crystal panel on an upper surface of said light guide and above said substrate, said light guide including a plurality of engagement pawls engaging said substrate and a pressing member connected to said substrate adjacent said elastic connector so as to apply a predetermined uniform pressure to said elastic connector.

7. A liquid crystal device according to claim 6, wherein said light guide further includes a protruding part for overlappingly securing the liquid crystal panel to the upper surface of said light guide.

8. A liquid crystal panel according to claim 6, wherein said light guide further includes at least two fixing pawls formed on each of two opposite sides of said light guide, said fixing pawls including a protruding latch at an end thereof for overlappingly engaging said liquid crystal panel.

9. A liquid crystal panel according to claim 6, wherein said pressing member further comprises a latch extending from said light guide and including a protruding pawl engaging said main substrate.

10. A liquid crystal panel according to claim 6, wherein said pressing member further comprises a flange extending from said light guide and secured to said main substrate by a screw.

* * * * *

UNITED STATES PATENT AND TRADEMARK OFFICE
CERTIFICATE OF CORRECTION

PATENT NO. : 6,222,597 B1
DATED : April 24, 2001
INVENTOR(S) : Eiji Muramatsu

Page 1 of 1

It is certified that error appears in the above-identified patent and that said Letters Patent is hereby corrected as shown below:

Title page,
Item [56], References Cited, Foreign Patents, JP 2-27390 "1/1900" should be -- 1/1990 --.
Item [57], ABSTRACT, line 3, "an" should be -- a --.
Item [57], ABSTRACT, line 20, "allowing" should be -- allow --.

Column 2,
Line 31, "including" should be -- includes --.

Column 3,
Line 29, delete "of".
Line 47, delete "of".
Line 52, delete "of".
Line 64, after "of" insert -- the --.

Column 4,
Line 50, "substrate" should be -- substrates --.

Column 10,
Line 46, "claim 2" should be -- claim 1 --.

Signed and Sealed this

Twentieth Day of November, 2001

Attest:

*Nicholas P. Godici*

NICHOLAS P. GODICI
*Attesting Officer*   *Acting Director of the United States Patent and Trademark Office*